June 20, 1961 R. HEIDESTER 2,989,591
FREQUENCY SHIFT RECEIVER FOR RECEIVING
TELEGRAPHY INTELLIGENCE
Filed Feb. 7, 1958 2 Sheets-Sheet 1
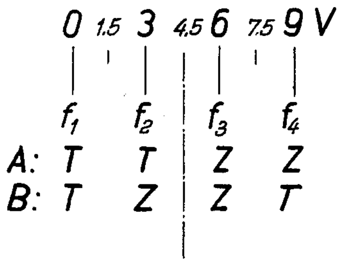
Fig. 1: Diplex
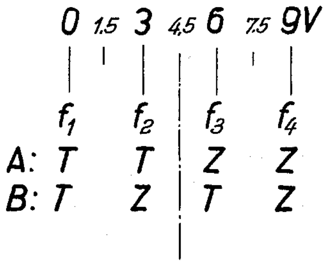
Fig. 2: Duoplex (Twinplex)
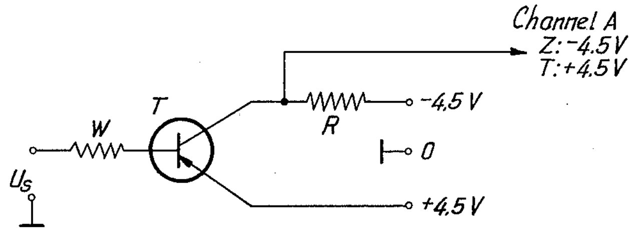
Fig. 3: Diplex and Duoplex, Channel A
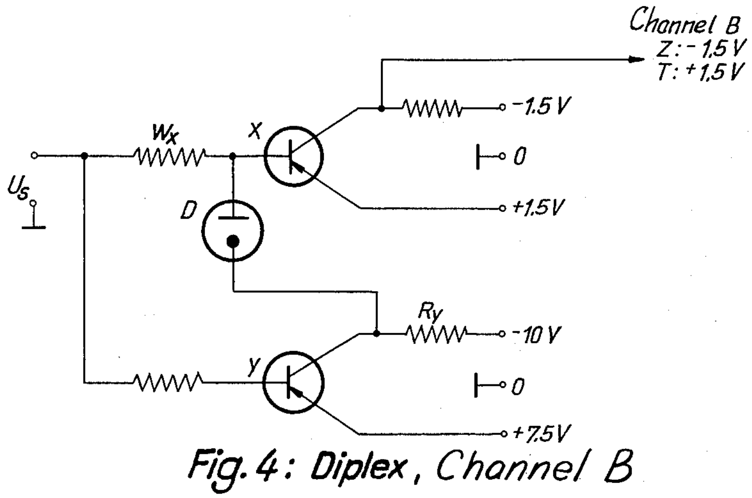
Fig. 4: Diplex, Channel B
Inventor:
Rudolf Heidester
By [signature]
Patent Agent June 20, 1961 R. HEIDESTER 2,989,591
FREQUENCY SHIFT RECEIVER FOR RECEIVING TELEGRAPHY INTELLIGENCE
Filed Feb. 7, 1958 2 Sheets-Sheet 2
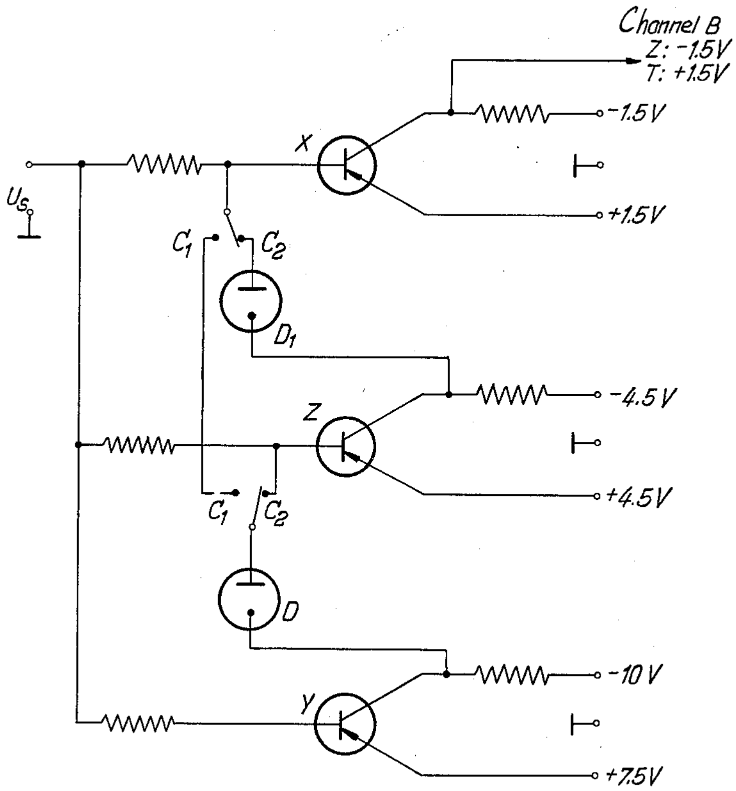
Fig.5: Duoplex, Channel B (or Diplex)
Inventor:
Rudolf Heidester
By [signature]
Patent Agent United States Patent Office 2,989,591

Patented June 20, 1961

2,989,591

FREQUENCY SHIFT RECEIVER FOR RECEIVING TELEGRAPHY INTELLIGENCE

Rudolf Heidester, Ulm (Danube), Germany, assignor to Telefunken G.m.b.H., Berlin, Germany Filed Feb. 7, 1958, Ser. No. 713,839
Claims priority, application Germany Feb. 23, 1957
3 Claims. (Cl. 178—88)

For transmitting two separate telegraphic intelligence signals, for example by means of the same wireless transmitter according to the frequency shift method, four different frequencies are necessary, only on of them being transmitted at a time. Various methods are available therefor, such as the diplex method and the duoplex method also called twinplex. In accordance with an international agreement the diplex method is also denoted as code 1 of the two-channel F1 method and the duoplex method as code 2. Distribution of the mark and space conditions to the four frequencies is illustrated in FIGS. 1 and 2. Both methods differ from each other only by the B channel.

It is well known to demodulate the received intelligence in a discriminator which delivers four different D.C. voltages corresponding to the four signal frequencies. In order to obtain the intelligence signal (A), for which only the polarity of the discriminator D.C. output voltage determines the mark and space conditions, said D.C. voltage is fed to a symmetrical amplitude limiter having a limiting voltage equal to or lower than the D.C. voltages correspondng to the two middle signal frequencies (*f2* and *f3* of FIG. 1). The other intelligence signal (B) is obtained as a result of exceeding—or falling short of—predetermined threshold D.C. voltages.

The invention shows how to use transistors in order to obtain both intelligence signals. The invention is by no means based on the known tube circuits but provides a simpler and more efficient circuit by using transistors as switches. A further advantage lies in the fact that the same receiver can be employed selectively for diplex or duoplex reception by actuating a mechanical switch.

According to the invention the aforementioned threshold D.C. voltages are used as bias for the emitters of the switch transistors, the bases of which are controlled by the signals and the collectors of which are connected to load resistors and supplied with operating voltages of opposed polarity with respect to the emitter bias, both signals (A, B) being obtained as follows:

One signal (A) is derived from the collector of a transistor connected as previously explained. The other signal (B) is derived from the collector of a transistor belonging to a group of transistors connected as previously explained and having the lowest emitter bias, and the collector of the transistor having the next higher bias is connected to the base of the first-mentioned transistor via a diode so polarised that when the collector voltage of the second-mentioned transistor is negative, the diode conducts, thereby transferring the collector voltage to the base of the first-mentioned transistor and controlling said transistor, while for the twinplex method a third transistor is coupled to the second-mentioned transistor in the same manner via another diode.

In order that the present invention may be clearly understood and readily carried into effect, the same will be described with reference to the accompanying drawings.

FIGS. 1 and 2 are charts representing the manner in which telegraphic transmitters are operated for diplex and twinplex transmissions;

FIG. 3 is a schematic circuit diagram of a transistor switch used in this invention;

FIG. 4 is a schematic circuit diagram of a pair of transistor switches used in diplex transmission according to this invention; and FIG. 5 is a schematic circuit diagram of a plurality of interconnected transistor switches in accordance with the principles of this invention.

FIG. 1 represents the distribution of the four frequencies to both intelligence signals for diplex reception. The four dashes denoted by *f1*, *f2*, *f3*, *f4* represent the four frequencies symmetrical to the centre frequency (dash-dotted line). Above these dashes there are indicated voltage values from 0 to 9 v. which serve as examples for the D.C. output voltage of the discriminator. The intelligence signal A is characterised in that the frequency lies for example on the left-hand side of the centre frequency (*f1* or *f2*) when spaces T are being transmitted, and on the right-hand side of the centre frequency (*f3* or *f4*) when marks are being transmitted. Whether the frequency is *f1* or *f2*, *f3* or *f4* depends at any instant on the other intelligence signal B. For the intelligence signal B the space condition T is given by the frequency *f1* or *f4*, the mark condition Z by the frequency *f2* or *f3*. Whether the frequency *f1* or *f4* occurs for the space condition, or the frequency *f2* or *f3* for the mark condition depends on the intelligence signal A.

With duoplex reception, the distribution of the four frequencies for the intelligence signal A is identical to the diplex reception. However, for the intelligence signal B the distribution is such as represented in FIG. 2.

FIG. 3 shows the circuit for obtaining channel A, said circuit being used within the scope of the invention. The D.C. voltage $U_s$ derived from the discriminator and corresponding to the signal frequency at any instant, is fed to the base of the transistor T via a decoupling resistor W. When the signal voltage $U_s$ is lower then the bias—+4.5 v.—of the emitter with respect to the base (i.e. —4.5 v. of the base with respect to the emitter), the transistor becomes conducting, thus acting as a short-circuit so that the voltage +4.5 v. is fed to the collector. If the signal voltage $U_s$ exceeds the value of +4.5 v., the negative bias of the base relative to the emitter is eliminated and the transistor becomes non-conducting. There is no longer any conducting connection between collector and emitter so that, because of the absence of voltage drop across the resistor R, the collector takes up the voltage —4.5 v. Transition range between conducting and non-conducting states of the transistor is very small. It involves only about 200 mv. between base and emitter.

If, in FIG. 1, the D.C. voltage is lower than the voltage of +4.5 v. corresponding to the centre frequency (on the left of the centre frequency) the transistor of FIG. 3 is conducting, thus delivering an output voltage of +4.5 v. (space condition T of the channel A in FIG. 1). If the D.C. voltage of FIG. 1 is higher than +4.5 v. (on the right of the centre frequency) the transistor of FIG. 3 is non-conducting so that an output voltage of −4.5 v. is delivered (mark condition Z of the channel A).

FIG. 4 shows the circuit for obtaining channel B of FIG. 1. The voltage $U_s$ derived from the discriminator and identical to the voltage $U_s$ of FIG. 3 is applied to the transistor X via the decoupling resistor $W_x$; the emitter of said transistor is biased with +1.5 v. and its collector with −1.5 v. The bias +1.5 v. of the emitter forms the threshold of 1.5 v. of FIG. 1. The purpose of this threshold will be explained hereafter.

The circuit must be so arranged that switching occurs when changing over from T to Z or from Z to T, in other words, when the signal of channel B (FIG. 1) reaches the voltage values 1.5 v. or 7.5 v. When exceeding +1.5 v., the transistor X becomes non-conducting. As a result, the previously positive collector voltage of +1.5 v. jumps over to the value of the negative operating voltage, that is, −1.5 v. This value corresponds to the mark condition Z of the signal of channel B in FIG. 1 (voltage between +1.5 v. and +7.5 v.).

When, however, the amplitude of the marks at the output of the discriminator is higher than 7.5 v., the previously conducting transistor is cut off and its collector voltage is changed from +7.5 v. to −10 v. Now the diode D conducts because, owing to the signal, the anode of the diode has a voltage of about +7.5 v. and the cathode a voltage of −10 v. Because of the small internal resistance of the diode D, the negative collector voltage (−10 v.) becomes effective at the base of the transistor X, relatively to the applied signal voltage of +7.5 v., and causes the transistor X to conduct again. The collector voltage for the transistor Y (say, 10 v.), as well as the resistances $W_x$ and $R_y$ and the internal resistance of the diode D, must be so selected that, when exceeding a voltage $U_s$ of 7.5 v.—i.e. when the transistor Y is cut off—the voltage at the base of the transistor X is assured to be lower than 1.5 v.

When the transistor X has become conducting under the influence of the diode D, its collector voltage is changed back from −1.5 v. to +1.5 v. This voltage corresponds to the space condition T of the signal. The transitory value of −1.5 v. which the collector voltage may take up is overrun so rapidly that the reception indicator does not respond to it (in the case of a keying apparatus the short pulse is suppressed in the low-pass filter thereof).

The circuit according to FIG. 5 is arranged for duoplex reception of channel B in FIG. 2, when both switches are on the position C2 (code 2). After switching over to C1 (code 1) the utilized portion of the circuit in FIG. 5 is the same as the arrangement of FIG. 4, so that it can be used for diplex reception. Transistors X and Y, the bias thereof and the diode D are the same as in FIG. 4. In addition, there are provided the transistor Z and the diode D1, because, according to FIG. 2, channel B has a third transition point at 4.5 v. beside the two transitions at 1.5 v. and 7.5 v. For this purpose the additional transistor Z has bias voltages of +4.5 v. and −4.5 v. If the signal voltage $U_s$ delivered by the discriminator is lower than 1.5 v. there is set up a voltage of +1.5 v. at the output of the conducting transistor X, said voltage corresponding to the space condition T in FIG. 2, channel B, at the left-hand end. When exceeding 1.5 v., the previously conducting transistor X is cut off (as in FIG. 4) so that −1.5 v. is set up at the output (corresponding to the mark condition Z in FIG. 2, channel B, on the left-hand side adjacent to the centre frequency).

Above +4.5 v. the previously conducting transistor Z is cut off, so that, instead of +4.5 v., a voltage of −4.5 v. is set up at its collector, whereby the diode D1 is changed over from the non-conducting to the conducting state. It results therefrom that a portion of the collector voltage of −4.5 v. flows via said diode to the base of the transistor X and causes it to conduct. A voltage of +1.5 v. is set up at the output, thus corresponding to the space condition T (FIG. 2, channel B on the right-hand side, adjacent to the centre frequency).

When the marks exceed the value of +7.5 v., the transistor Y is changed over from the conducting to the non-conducting condition, so that a voltage of −10 v. instead of +7.5 v. is set up at its collector and, as in FIG. 4, the diode D conducts. The transistor Z which is cut off between 4.5 v. and 7.5 v. conducts again, so that a voltage of +4.5 v., instead of −4.5 v., is set up at its collector. The diode D1 and the transistor X are cut off. At the collector of the transistor X there is set up an output voltage of −1.5 v. corresponding to the desired mark condition Z.

I claim:

1. In a receiver including discriminator means having an output terminal at which there appears one of four different voltages at equally spaced levels symmetrically disposed in pairs above and below a mean value with reference to the ground potential and representing channel A mark and space signals determined by whether the voltage is above or below said mean value and further representing channel B mark and space signals depending upon the absolute value of the instantaneous voltage level, an electronic circuit for converting said voltages into separate channel signals, said circuit comprising: a channel A transistor having its collector returned to a source of operating potential through a resistor and delivering at its collector channel A mark or space signals depending on whether or not the transistor is conductive, and said transistor having one of its other electrodes connected to a first bias source and maintained at the potential of said mean value and the other of its electrodes coupled to the output terminal of the discriminator to thereby control the conductivity of the transistor; a channel B transistor having its collector returned to a source of operating potential through a resistor and delivering at its collector channel B mark or space signals depending on whether or not the channel B transistor is conductive and said channel B transistor having its emitter connected to a second bias source and maintained at a potential intermediate the levels of the first and second discriminator voltages and having its base coupled to the output terminal of the discriminator for controlling the conductivity of the channel B transistor to deliver mark or space signals dependent upon whether said output is above or below said intermediate level; and auxiliary transistor circuit means including a first auxiliary transistor having its collector returned to a source of operating potential through a resistor and having its base coupled to the output terminal of said discriminator and controlled thereby, a first diode connected with the collector of said auxiliary transistor and coupled by connecting means to the base of said channel B transistor, the diode being poled to conduct current to the base of the channel B transistor from the source to which the auxiliary transistor collector is returned whenever the auxiliary transistor is nonconductive to bias the channel B transistor conductive through the diode, and the emitter of the auxiliary transistor being connected to a third bias source and maintained at a potential intermediate two voltage levels of the discriminator other than the first and second levels.

2. An electronic circuit as set forth in claim 1, further comprising: a second auxiliary transistor interposed in the circuit between the first-mentioned auxiliary transistor and the channel B transistor and having its base connected to the discriminator output terminal and its collector returned to a source of operating potential through a resistor and having a second diode connected to its collector and coupled by second connecting means to the base of said channel B transistor, the diode being poled to conduct current from the last mentioned source of potential to the base of the channel B transistor whenever the second auxiliary transistor is non-conductive to bias the channel B transistor conductive, and the emitter of the second auxiliary transistor being coupled to a fourth bias source to maintain it at a potential intermediate two voltage levels of the discriminator other than the above-mentioned intermediate levels.

3. In an electronic circuit as set forth in claim 2, said first and second connecting means comprising switches for selecting diplex operation by connecting the first diode to the base of the channel B transistor and disconnecting the second diode, and for selecting duoplex operation by connecting the second diode to the base of the channel B transistor and connecting the first diode to the base of the second auxiliary transistor.

References Cited in the file of this patent

UNITED STATES PATENTS

| | | |
|---|---|---|
| 2,650,266 | Browning | Aug. 25, 1953 |
| 2,701,276 | Pletscher | Feb. 1, 1955 |
| 2,710,928 | Whitney | June 14, 1955 |